United States Patent
Hartmann

(10) Patent No.: US 9,039,552 B2
(45) Date of Patent: May 26, 2015

(54) SECONDARY ASSEMBLY DRIVE OF AN INTERNAL COMBUSTION ENGINE AND METHOD FOR OPERATING SAME

(75) Inventor: Bernd Hartmann, Weisendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 47 days.

(21) Appl. No.: 13/992,384

(22) PCT Filed: Sep. 30, 2011

(86) PCT No.: PCT/EP2011/067063
§ 371 (c)(1),
(2), (4) Date: Jun. 7, 2013

(87) PCT Pub. No.: WO2012/079795
PCT Pub. Date: Jun. 21, 2012

(65) Prior Publication Data
US 2013/0267363 A1    Oct. 10, 2013

(30) Foreign Application Priority Data
Dec. 15, 2010    (DE) .......................... 10 2010 054 630

(51) Int. Cl.
| | |
|---|---|
| *F16H 7/00* | (2006.01) |
| *F02N 11/04* | (2006.01) |
| *B60K 6/485* | (2007.10) |
| *B60K 25/02* | (2006.01) |
| *F02B 67/06* | (2006.01) |
| *F16H 7/02* | (2006.01) |
| *B60K 25/00* | (2006.01) |

(52) U.S. Cl.
CPC ............... *F02N 11/04* (2013.01); *B60K 6/485* (2013.01); *B60K 25/02* (2013.01); *B60K 2025/005* (2013.01); *B60K 2025/024* (2013.01); *B60Y 2400/427* (2013.01); *F02B 67/06* (2013.01); *F16H 7/02* (2013.01); *Y02T 10/6226* (2013.01)

(58) Field of Classification Search
CPC ............... F16H 7/06; F16H 7/02; F01L 1/02; F01L 1/022; F16G 13/04
USPC ............................................ 474/84
See application file for complete search history.

(56) References Cited

U.S. PATENT DOCUMENTS

| | | | | |
|---|---|---|---|---|
| 4,662,861 | A | * | 5/1987 | Seung et al. ................... 474/86 |
| 5,539,286 | A | * | 7/1996 | Brinkmeyer et al. .......... 318/139 |
| 2003/0176249 | A1 | * | 9/2003 | Polster et al. ................. 474/134 |
| 2004/0261753 | A1 | * | 12/2004 | Garabello et al. .......... 123/198 C |

(Continued)

FOREIGN PATENT DOCUMENTS

| | | |
|---|---|---|
| CN | 101342861 | 1/2009 |
| CN | 101559710 | 10/2009 |
| DE | 4335771 | 3/1995 |

(Continued)

*Primary Examiner* — Henry Liu
(74) *Attorney, Agent, or Firm* — Volpe and Koenig, P.C.

(57) ABSTRACT

A secondary assembly drive of an internal combustion engine and a method for operating same are provided. The secondary assembly drive includes, in two drive planes, an assembly drive (2) and a starter drive (12) and permits, in addition to a normal operating mode, the following operating modes: —starting of the internal combustion engine, —boosting of the internal combustion engine, —air-conditioning, and —deactivation of the assembly drive (2).

10 Claims, 2 Drawing Sheets

(56) References Cited

U.S. PATENT DOCUMENTS

2006/0145643 A1\* 7/2006 Brunetiere .................... 318/432
2009/0013952 A1\* 1/2009 Deniston et al. ......... 123/179.28
2009/0255741 A1\* 10/2009 Major et al. ............... 180/65.22
2010/0145573 A1\* 6/2010 Vasilescu ........................ 701/36

FOREIGN PATENT DOCUMENTS

| EP | 1367696 | 12/2003 |
| FR | 2923420 | 5/2009 |
| GB | 2450985 | 1/2009 |

\* cited by examiner

SECONDARY ASSEMBLY DRIVE OF AN INTERNAL COMBUSTION ENGINE AND METHOD FOR OPERATING SAME

BACKGROUND

The invention relates to a secondary assembly drive of an internal combustion engine and to a method for operating this drive. The secondary assembly drive comprises two parallel drive planes and:
- a first crankshaft wheel that can be rotationally connected to a crankshaft of the internal combustion engine and is arranged in the first drive plane,
- a second crankshaft wheel that can be rotationally connected to the crankshaft and is arranged coaxial to the first crankshaft wheel in the second drive plane,
- an electric machine that can be operated selectively as a generator or as a motor with a machine shaft,
- a first machine shaft wheel that can be rotationally connected to the machine shaft and is arranged in the first drive plane, in order to be driven by the crankshaft in the generator mode of the electric machine,
- a second machine shaft wheel that can be rotationally connected to the machine shaft and is arranged coaxial to the first machine shaft wheel in the second drive plane, in order to drive the crankshaft in the motor mode of the electric machine,
- an endlessly rotating first traction mechanism that wraps around the wheels arranged in the first drive plane,
- an endlessly rotating second traction mechanism that wraps around the wheels arranged in the second drive plane,
- a first coupling that is arranged in the first drive plane and allows the machine shaft to be taken over relative to the crankshaft,
- and a second coupling that is arranged in the second drive plane and allows the crankshaft to be taken over relative to the machine shaft.

A dual belt drive according to the class for driving ancillary drives of an internal combustion engine emerges from US 2006/0145643 A1. The individual drives in the two drive planes, called ancillary drive and starter drive below, are configured with different transmission ratios from the crankshaft to the machine shaft so that, when the belts of the internal combustion engine start up, the highest possible starting torque is transferred from the electric machine to the crankshaft. Here, both couplings, of which the first coupling allows the machine shaft to be taken over relative to the crankshaft and, in contrast, the second allows the crankshaft to be taken over relative to the machine shaft, are formed as clamping roller freewheels and are arranged in the drive sense between the machine shaft and the two machine shaft wheels, i.e., on the side of the electric machine.

SUMMARY

The invention is based on the objective of improving the design of an ancillary drive of the type mentioned above and disclosing a method for operating such an ancillary drive.

This objective is met, in terms of the device and in terms of the method, according to the invention. Advantageous constructions of the invention can be taken from the description and claims below.

Accordingly, the second coupling is a freewheel coupling that is arranged, in the drive sense, between the second crankshaft wheel and the crankshaft and allows the crankshaft to be taken over relative to the second crankshaft wheel. One essential advantage of this structural design according to the invention is based on the fact that the available installation space for the freewheel coupling on the side of the crankshaft is significantly larger than on the side of the machine shaft and results in the fact that the highly loaded contact surfaces during the starting process of the internal combustion engine can be dimensioned in the freewheel coupling in sufficient number and size corresponding to the starting torque to be transferred.

The freewheel coupling is advantageously a clamping roller freewheel whose inner ring rotates with the second crankshaft wheel and whose outer ring rotates with the crankshaft, wherein the spring-mounted clamping rollers are opposite ramp-shaped recesses in the outer ring. This known construction of the freewheel coupling that lifts as a function of centrifugal force for the benefit of lower contact friction at higher rotational speeds is called an external star freewheel below.

The first coupling is a freewheel coupling that is arranged in the drive sense between the first machine shaft wheel and the machine shaft and allows, in the rotational direction of the generator mode, the machine shaft to be taken over relative to the first machine shaft wheel. This freewheel coupling is advantageously also a clamping roller freewheel whose inner ring, however, rotates with the machine shaft and whose outer ring rotates with the first machine shaft wheel, wherein the spring-mounted clamping rollers are opposite ramp-shaped recesses in the inner ring. This known design of the freewheel coupling, especially in the form of generator freewheels, blocks essentially without influencing the rotational speed and is called an inner star freewheel below.

As an alternative to such a freewheel, on the side of the electric machine, a spring decoupling can also be provided with two-sided stops or basically also a rigid connection between the first machine shaft wheel and the machine shaft, wherein, however, the ancillary drive must then be equipped with an (actively) switchable freewheel.

In addition, in the drive sense between the first crankshaft wheel and the crankshaft there can be a controllable third coupling for the operative disconnection of the first drive plane from the crankshaft. When the third coupling is open, on one hand, when the internal combustion engine is running, the ancillary drive can be stopped, in order to minimize its operative friction losses. On the other hand, when the internal combustion engine is stopped, air conditioning can be provided when the vehicle is parked. For this purpose, another motor mode of the electric machine with the rotational direction opposite that for the generator mode and an air-conditioning system compressor can be provided that is formed for a compressor operation in both rotational directions. A compressor wheel that can be rotationally connected to a compressor shaft of the air-conditioning system compressor is arranged in the ancillary drive, in order to drive the air-conditioning system compressor in the generator mode, i.e., in one direction when the internal combustion engine is running, and in the additional motor mode, i.e., in the other direction when the internal combustion engine is stopped. In the additional motor mode, the rotational direction in the opposite direction relative to that in the generator mode prevents a drive-dependent change of the taut section and slack section in the ancillary drive, so that a tensioning device for pre-tensioning the first traction mechanism is arranged in the slack section, i.e., always functionally optimized both when the internal combustion engine is running (generator mode and normal air-conditioning mode) and also when the internal combustion engine is stopped (mode for air conditioning when the vehicle is parked).

Relative to a freewheel coupling, the third coupling should be actively switchable, for which, in particular, electrically controllable magnetic couplings are available. This also applies to a controllable fourth coupling that should be arranged, for the operative disconnection of the second drive plane from the machine shaft, in the drive sense between the second machine shaft wheel and the machine shaft. An opening of the fourth coupling after the internal combustion engine starts up has the effect that the starter drive runs down after the startup process of the internal combustion engine and stops when the internal combustion engine is running.

A tensioning device arranged in the slack section can be used for the pre-tensioning of the traction mechanism of the ancillary drive and the starter drive.

For the operation of the ancillary drive according to the invention, at least three operating modes are provided:
- a start mode in which the electric machine is operated as a motor and drives the crankshaft until the internal combustion engine starts up,
- a normal operating mode in which the electric machine is operated as a generator and is driven by the crankshaft,
- and a boost mode in which the electric machine is operated as a motor and supports the driving of the crankshaft when the internal combustion engine is running.

According to the construction of the ancillary drive, the following operating modes are optionally possible:
- a switch-off mode in which the third coupling is open and the first drive plane, i.e., the ancillary drive, is operatively disconnected from the crankshaft,
- a mode for air conditioning when the vehicle is parked in which the third coupling is open and the electric machine is operated in another motor mode in the rotational direction opposite that of the generator mode and drives the air-conditioning system compressor,
- and an expanded normal operating mode in which the fourth coupling is open and the second drive plane, i.e., the starter drive, is operatively disconnected from the machine shaft.

As preferred traction mechanisms there are, on the side of the ancillary drive, a non-positive fit poly-V belt and, on the side of the starter drive, a positive fit toothed belt. An ancillary drive according to the invention can nevertheless also be a chain-chain drive or a belt-chain drive. Other ancillary drives, optionally also in other drive planes, can also be provided. This relates, in particular, to a coolant pump that is arranged in the ancillary drive for cooling the internal combustion engine and is also formed for a pumping operation in both operative rotational directions. According to the construction of the coolant pump, its reversal of rotational direction does not lead to a change of the suction and pressure sides, but can be associated with pumping rates of different magnitudes. Analogous to air conditioning when the vehicle is parked or cooling of the vehicle interior, coolant that is heated during operation and is circulated when the internal combustion engine is stopped can be used for heating the vehicle interior (heating when the vehicle is parked).

The control/regulation of the individual operating modes is realized with the help of state parameters of the internal combustion engine, optionally the temperature of the vehicle interior, and, if provided, the switching state of the controllable couplings.

BRIEF DESCRIPTION OF THE DRAWINGS

Additional features of the invention are also given from the following description and from the drawings that show schematically an ancillary drive according to the invention for a motor vehicle internal combustion engine. Shown are.

DETAILED DESCRIPTION OF THE PREFERRED EMBODIMENTS

Figure 1:
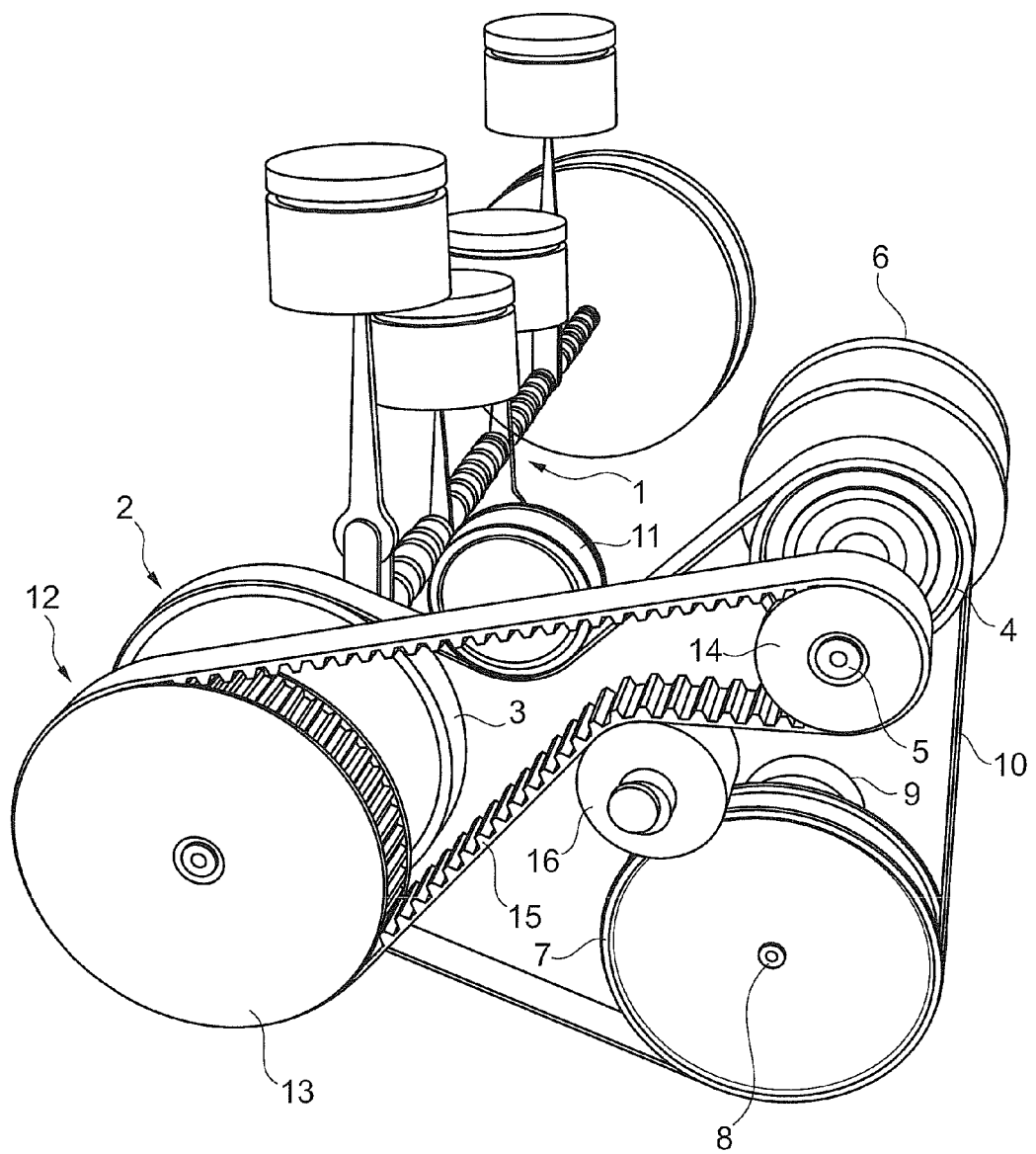
FIG. 1 the layout of the ancillary drive in a perspective view.

FIG. 1 discloses the crankshaft drive of an internal combustion engine with an ancillary drive that is arranged on the free end of the crankshaft 1 and is constructed as a double belt drive in two parallel drive planes. The ancillary drive 2 running in the first drive plane comprises a first crankshaft wheel 3 that is arranged on the crankshaft 1, a first machine shaft wheel 4 that is arranged on the machine shaft 5 of an electric machine 6, a compressor wheel 7 that is arranged on the compressor shaft 8 of an air-conditioning system compressor 9, a first traction mechanism wrapping around the first wheels 3, 4, 7 in the form of an endlessly rotating poly-V belt 10, and a first tensioning device in the form of a known spring-loaded belt tensioner 11 between the first crankshaft wheel 3 and the first machine shaft wheel 4.

The starter drive 12 in the second drive plane comprises a second crankshaft wheel 13 that is arranged on the crankshaft 1 coaxial to the first crankshaft wheel 3, a second machine shaft wheel 14 that is arranged on the machine shaft 5 coaxial to the first machine shaft wheel 4, a second traction mechanism wrapping around the second wheels 13, 14 in the form of an endlessly rotating toothed belt 15, and a second tensioning device also in the form of a known belt tensioner 16 between the second crankshaft wheel 13 and the second machine shaft wheel 14.

The electric machine 6 is a starter generator that drives the machine shaft 5 in the starter mode and in the motor mode and is driven by the machine shaft 5 in the generator mode.

The air-conditioning system compressor 9 is a wobble plate compressor that is formed for a compressor operation in both rotational directions and is inserted into the coolant circuit of the vehicle air-conditioning system independent of the rotational direction accordingly.

Figure 2:
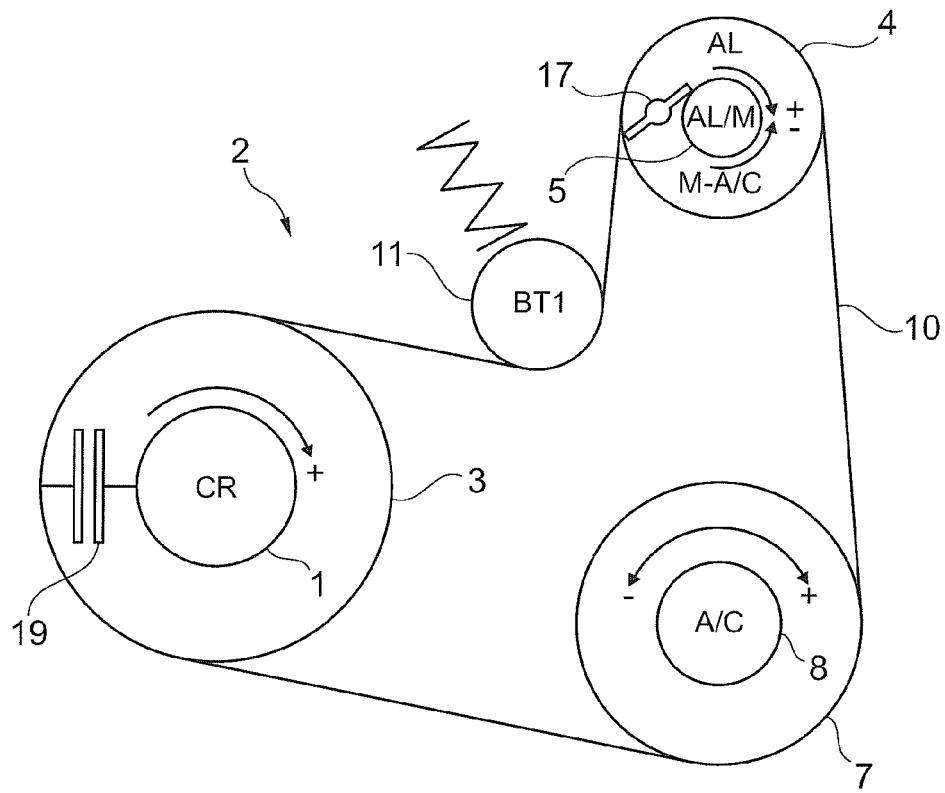
FIG. 2 the ancillary drive (first drive plane) in a schematic view.
Figure 3:
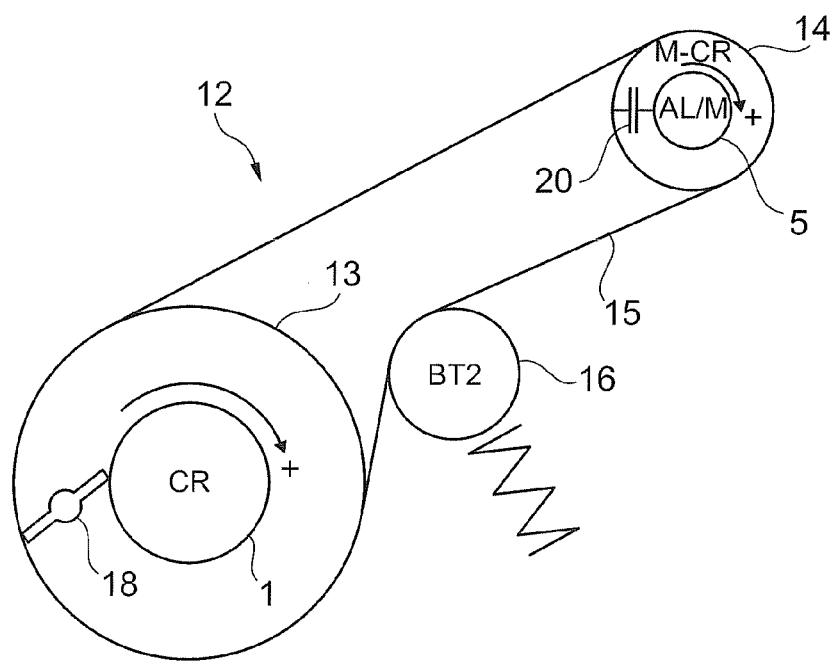
FIG. 3 the starter drive (second drive plane) in a schematic view.

The drive-specific interconnection of the ancillary drive is given from the schematically shown individual drives, wherein FIG. 2 shows the ancillary drive 2 and FIG. 3 shows the starter drive 12. The operative rotational direction of the crankshaft 1, which is also called CR here, corresponds to the rotational direction drawn with a plus sign. The rotational direction of the machine shaft 5 also drawn with AL/M is positive when the electric machine 6 is in generator mode AL and is driven by the crankshaft 1 and also when the electric machine 6 is in the motor mode M-CR and drives the crankshaft 1. The rotational direction of the machine shaft 5 has a minus sign when the electric machine 6 is in an additional motor mode M-A/C and drives the air-conditioning system compressor 8, which is also called A/C here, in the air-conditioning system compressor 9 in a correspondingly reverse rotational direction when the internal combustion engine is stopped.

In the ancillary drive 2, the rotational connection of the first machine shaft wheel 4 to the machine shaft 5 is realized by means of a first coupling 17 in the form of a clamping roller freewheel that is constructed as an inner star freewheel and allows, in the positive rotational direction, the machine shaft 5 to be taken over relative to the first machine shaft wheel 4 and thus relative to the crankshaft 1 and blocks in the correspondingly opposite, negative rotational direction. The clamping roller freewheel 17 is constructed as a generator freewheel with the known decoupling function of the generator, wherein its inner ring rotates with the machine shaft 5 and wherein its outer ring rotates with the first machine shaft wheel 4.

In the starter drive 12, the rotational connection of the second crankshaft wheel 13 to the crankshaft 1 is realized by means of a second coupling 18 in the form of a clamping roller freewheel that is constructed as an outer star freewheel and allows, in the positive rotational direction, the crankshaft 1 to be taken over relative to the second crankshaft wheel 13 and thus relative to the machine shaft 5 and is blocks in the correspondingly opposite rotational direction. The clamping roller freewheel 18 is arranged structurally so that its inner ring rotates with the second crankshaft wheel 13 and its outer ring rotates with the crankshaft 1.

The first crankshaft wheel 3 is rotationally connected to the crankshaft 1 by means of a third coupling 19 in the form of an electrically controllable magnetic coupling (this can be either open when de-energized or closed when de-energized). In the open state, the magnetic coupling 19 is used for the operative disconnection of the ancillary drive 2 from the crankshaft 1.

The second machine shaft wheel 14 is rotationally connected to the machine shaft 5 by means of a fourth coupling 20 also in the form of an electrically controllable magnetic coupling (this can be either open when de-energized or closed when de-energized). In the open state, the magnetic coupling 20 is used for the operative disconnection of the starter drive 12 from the machine shaft 5.

The compressor wheel 7 can be rotationally connected to the compressor shaft 8 optionally with a controllable (not shown) magnetic coupling.

The following ratio of the transmission ratios TR1 and TR2 applies, namely TR1>TR2, if TR1 is the rotational speed ratio between the first crankshaft wheel 3 and the first machine shaft wheel 4 and if TR2 is the rotational speed ratio between the second crankshaft wheel 13 and the second machine shaft wheel 14.

The following operating modes for the ancillary drive are provided:

a) a start mode in which the electric machine 6 drives the crankshaft 1 from a standstill until the internal combustion engine starts:
   the electric machine 6 is in the motor mode M-CR with positive rotational direction,
   the magnetic coupling 19 is closed (but could also be open),
   the magnetic coupling 20 is closed,
   the crankshaft 1 is driven by means of the starter drive 12 and drives the ancillary drive 2 by means of the closed magnetic coupling 19 and the first crankshaft wheel 3: due to the previously mentioned transmission ratios TR1 and TR2, the first coupling 17 is in the freewheel position and the second coupling 18 is in the blocking position,
   the internal combustion engine starts and when the internal combustion engine is running, the first coupling 17 is in the blocking position and the second coupling 18 is in the freewheel position,
   the magnetic coupling 20 is open and the starter drive 12 disconnected operatively from the machine shaft 5 comes to a stop,
   the first belt tensioner 11 also called BT1 and the second belt tensioned 16 called BT2 are always in the slack section of the respective belt drive 2 or 12 optimally in terms of function, i.e., both before and also after the startup process of the internal combustion engine;

b) a normal operating mode in which the electric machine 6 is driven by the crankshaft 1 of the running internal combustion engine:
   the electric machine 6 is in the generator mode AL with positive rotational direction,
   the magnetic coupling 20 is open and the starter drive 12 is stopped (expanded normal operating mode),
   the magnetic coupling 19 is closed and the crankshaft 1 drives the ancillary drive 2 by means of the first crankshaft wheel 3,
   the first coupling 17 is in the clamping position and the electric machine 6 is in the generator mode AL with positive rotational direction,
   the compressor wheel 7 is driven in the positive rotational direction,
   the first belt tensioner 11 is in the slack section of the ancillary drive 2;

c) a boost mode in which, when the internal combustion engine is running, the electric machine 6 assists in the driving of the crankshaft 1:
   the electric machine 6 is in the motor mode M-CR with positive rotational direction,
   the magnetic coupling 19 is closed (but could also be open),
   the magnetic coupling 20 is closed,
   the rotating crankshaft 1 of the running internal combustion engine is driven by means of the starter drive 12 and drives the ancillary drive 2 by means of the closed magnetic coupling 19 and the first crankshaft wheel 3: due to the previously mentioned transmission ratios TR1 and TR2, the first coupling 17 is in the freewheel position and the second coupling 18 is in the blocking position,
   the end of the boost mode: the electric machine 6 changes from the driving motor mode M-CR to the driven generator mode AL that sets in when reaching the same rotational speeds of the first machine shaft wheel 4 and the machine shaft 5,
   the magnetic coupling 20 is open and the starter drive 12 operatively disconnected from the machine shaft 5 comes to a stop,
   as in the start mode, the belt tensioners 11 and 16 are always in the slack section of the respective belt drive 2 or 12 optimally in terms of function.

d) a switch-off mode in which the magnetic coupling 19 is open and the ancillary drive 2 is operatively disconnected from the crankshaft 1;
   the internal combustion engine is running,
   the ancillary drive 2 is stopped,
   the starter drive 12 is stopped or in boost mode,
   the connection of the ancillary drive 2 is realized by closing the magnetic coupling 19. For reducing transient load spikes during the rotational synchronization of the crankshaft 1 and ancillary drive 2, it can be useful to accelerate the electric machine 6 to a rotational speed above the connecting generator mode AL before the connection and/or to close the magnetic coupling 19 within the synchronization phase so that the drive torque that can be transferred by the magnetic coupling 19 is always less than a limiting torque that, if exceeded, would lead to a slippage of the poly-V belt 10 to an undesirable degree.

e) a mode for air conditioning when the vehicle is parked in which the electric machine 6 drives the air-conditioning system compressor 9 when the internal combustion engine is stopped:

the magnetic coupling 19 is open, the electric machine 6 is in an additional motor mode M-A/C with a rotational direction opposite that in the generator mode, the first coupling 17 is in the clamping position and the compressor wheel 7 is driven in the negative direction, the magnetic coupling 20 is closed (but could also be open) and the starter drive 12 is driven against the shown positive rotational direction, the second coupling 18 is in the freewheel position, the first belt tensioner 11 is in the slack section of the ancillary drive 2, the starting of the internal combustion engine from the mode for air conditioning when the vehicle is parked is realized by changing the rotational direction of the electric machine 6 from the (negative) additional motor mode M-A/C to the (positive) motor mode M-CR. Here, the first coupling 17 changes from the clamping position to the freewheel position and the ancillary drive 2 rotating "backward" comes to a stop. The second coupling 18 changes from the freewheel position to the clamping position and the crankshaft 1 is driven from the stopped state until the internal combustion engine starts—continues in the start mode under a).

LIST OF REFERENCE NUMBERS

1 Crankshaft
2 Ancillary drive
3 First crankshaft wheel
4 First machine shaft wheel
5 Machine shaft
6 Electric machine
7 Compressor wheel
8 Compressor shaft
9 Air-conditioning system compressor
10 First traction mechanism, poly-V belt
11 First tensioning device, first belt tensioner
112 Starter drive
13 Second crankshaft wheel
14 Second machine shaft wheel
15 Second traction mechanism, toothed belt
16 Second tensioning device, second belt tensioner
17 First coupling, clamping roller freewheel
18 Second coupling, clamping roller freewheel
19 Third coupling, magnetic coupling
20 Fourth coupling, magnetic coupling

The invention claimed is:

1. Ancillary drive of an internal combustion engine, comprising two parallel drive planes and:
    a first crankshaft wheel that is adapted to be rotationally connected to a crankshaft of the internal combustion engine and is arranged in the first drive plane,
    a second crankshaft wheel that is adapted to be rotationally connected to the crankshaft and is arranged coaxial to the first crankshaft wheel in the second drive plane,
    an electric machine that is operable selectively as a generator (AL) or as a motor (M) with a machine shaft,
    a first machine shaft wheel that is rotationally connected to the machine shaft and is arranged in the first drive plane, in order to be driven by the crankshaft in a generator mode of the electric machine,
    a second machine shaft wheel that can be rotationally connected to the machine shaft and is arranged coaxial to the first machine shaft wheel in the second drive plane, in order to drive the crankshaft in a motor mode of the electric machine,
    an endlessly rotating first traction mechanism that wraps around the wheels arranged in the first drive plane,
    an endlessly rotating second traction mechanism that wraps around the wheels arranged in the second drive plane,
    a first coupling that is arranged in the first drive plane and allows the machine shaft to be taken over relative to the crankshaft,
    and a second coupling that is arranged in the second drive plane and allows the crankshaft to be taken over relative to the machine shaft,
    the second coupling is a freewheel coupling that is arranged, in terms of the drive, between the second crankshaft wheel and the crankshaft and allows the crankshaft to be taken over relative to the second crankshaft wheel.

2. Ancillary drive according to claim 1, wherein the first coupling is a freewheel coupling that is arranged in a drive sense between the first machine shaft wheel and the machine shaft and allows, in a rotational direction of the generator mode, the machine shaft to be taken over relative to the first machine shaft wheel.

3. Ancillary drive according to claim 1, wherein in the drive sense, a controllable third coupling is arranged between the first crankshaft wheel and the crankshaft for operative disconnection of the first drive plane from the crankshaft.

4. Ancillary drive according to claim 3, wherein another motor mode of the electric machine with a rotational direction opposite that of the generator mode is provided and the ancillary drive comprises an air-conditioning system compressor that is formed for a compressor operation in both rotational directions and a compressor wheel that can be rotationally connected to a compressor shaft of the air-conditioning system compressor and is arranged in the first drive plane, in order to drive the air-conditioning system compressor in the generator mode and in the other motor mode.

5. Ancillary drive according to claim 1, wherein in the drive sense, a controllable fourth coupling is arranged between the second machine shaft wheel and the machine shaft for operative disconnection of the second drive plane from the machine shaft.

6. Ancillary drive according to claim 1, wherein in an area of a slack section running between the first crankshaft wheel and the first machine shaft wheel, there is a first tensioning device for pre-tensioning the first traction mechanism and in an area of a slack section running between the second crankshaft wheel and the second machine shaft wheel, there is a second tensioning device for pre-tensioning the second traction mechanism.

7. Method for operating an ancillary drive of an internal combustion engine, comprising two parallel drive planes and:
    a first crankshaft wheel that is adapted to be rotationally connected to a crankshaft of the internal combustion engine and is arranged in the first drive plane,
    a second crankshaft wheel that is adapted to be rotationally connected to the crankshaft and is arranged coaxial to the first crankshaft wheel in the second drive plane,
    an electric machine that is operable selectively as a generator (AL) or as a motor (M) with a machine shaft,
    a first machine shaft wheel that is rotationally connected to the machine shaft and is arranged in the first drive plane, in order to be driven by the crankshaft in a generator mode of the electric machine,
    a second machine shaft wheel that is rotationally connected to the machine shaft and is arranged coaxial to the first machine shaft wheel in the second drive plane, in order to drive the crankshaft in a motor mode of the electric machine, an endlessly rotating first traction mechanism that wraps around the wheels arranged in the first drive plane, an endlessly rotating second traction mechanism that wraps around the wheels arranged in the second drive plane, a first coupling that is arranged in the drive sense between the first machine shaft wheel and the machine shaft and allows, in a rotational direction of the generator mode, the machine shaft to be taken over relative to the first machine shaft wheel, and a second coupling that is arranged in the drive sense between the second crankshaft wheel and the crankshaft and allows the crankshaft to be taken over relative to the second crankshaft wheel, wherein the following operating modes are provided:

a start mode in which the electric machine is operated as a motor and drives the crankshaft until the internal combustion engine starts up, a normal operating mode in which the electric machine is operated as a generator and is driven by the crankshaft, and a boost mode in which the electric machine is operated as a motor and supports the driving of the crankshaft when the internal combustion engine is running.

8. Method according to claim 7, wherein the ancillary drive further comprises a controllable third coupling that is arranged in the drive sense between the first crankshaft wheel and the crankshaft, wherein the following operating mode is also provided when the internal combustion engine is running:

a switch-off mode in which the third coupling is open and the first drive plane is operatively disconnected from the crankshaft.

9. Method according to claim 8, wherein the ancillary drive further comprises:

an air-conditioning system compressor that is constructed for a compressor operation in both rotational directions, and a compressor wheel that can be rotationally connected to a compressor shaft of the air-conditioning system compressor and is arranged in the first drive plane, wherein the following operating mode is also provided when the internal combustion engine is stopped:

a mode for air conditioning when a vehicle is parked in which the third coupling is open and the electric machine is operated in another motor mode in a rotational direction opposite that of the generator mode and drives the air-conditioning system compressor.

10. Method according to claim 7, wherein the ancillary drive further comprises a controllable fourth coupling that is arranged in the drive sense between the second machine shaft wheel and the machine shaft, wherein the following operating mode is also provided when the internal combustion engine is running:

an expanded normal operating mode in which the fourth coupling is open and the second drive plane is operatively disconnected from the machine shaft.

* * * * *